United States Patent
Chou et al.

(10) Patent No.: US 8,706,473 B2
(45) Date of Patent: Apr. 22, 2014

(54) SYSTEM AND METHOD FOR INSERTION AND REMOVAL OF VIDEO OBJECTS

(75) Inventors: Jim Chen Chou, San Jose, CA (US); Rohit Puri, Campbell, CA (US); Tapabrata Biswas, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 139 days.

(21) Appl. No.: 13/231,635

(22) Filed: Sep. 13, 2011

(65) Prior Publication Data
US 2013/0066623 A1 Mar. 14, 2013

(51) Int. Cl.
*G06F 17/28* (2006.01)

(52) U.S. Cl.
USPC ............... 704/2; 704/270; 704/277; 704/500; 348/14.01; 348/14.08; 348/14.09; 348/14.13

(58) Field of Classification Search
USPC .................. 704/2, 8, 500, 503, 270, 277; 348/14.01, 14.08, 14.09, 14.13
See application file for complete search history.

(56) References Cited

U.S. PATENT DOCUMENTS

| | | | |
|---|---|---|---|
| 6,693,663 B1 * | 2/2004 | Harris .................. | 348/14.08 |
| 2007/0121425 A1 * | 5/2007 | Eble et al. ................ | 368/21 |
| 2007/0177463 A1 * | 8/2007 | Kataoka .................. | 368/21 |
| 2008/0165245 A1 * | 7/2008 | Sarkar et al. ............... | 348/14.09 |
| 2009/0144425 A1 * | 6/2009 | Marr et al. .................... | 709/226 |
| 2009/0210213 A1 * | 8/2009 | Cannon et al. ................... | 704/2 |
| 2010/0063815 A1 * | 3/2010 | Cloran et al. ................. | 704/235 |
| 2010/0119147 A1 * | 5/2010 | Blake et al. ................... | 382/164 |
| 2010/0268534 A1 * | 10/2010 | Kishan Thambiratnam et al. ............................ | 704/235 |
| 2011/0246172 A1 * | 10/2011 | Liberman et al. ................. | 704/2 |
| 2011/0270609 A1 * | 11/2011 | Jones et al. ................... | 704/235 |

OTHER PUBLICATIONS

Harmonic, Inc., "MPEG-4 AVC (H.264) Ad Insertion Solution," White Paper, Rev. 1.0, Jul. 2007, 10 pages; http://www.harmonicinc.com/view_collateral.cfm?ID=3606.

Tao Mei, et al., "VideoSense—Towards Effective Online Video Advertising," *MM '07*, Sep. 23-28, 2007, Augsburg, Vararia, Germany, © 2007, 10 pages; http://research.microsoft.com/en-us/um/people/xshua/publications/pdf/2007_acmmm_videosense.pdf.

* cited by examiner

*Primary Examiner* — Qi Han
(74) *Attorney, Agent, or Firm* — Patent Capital Group (57) ABSTRACT

An example method may include receiving a media stream from a first endpoint, where the media stream is intended for a second endpoint; processing the media stream according to at least one processing option; compressing the media stream; and communicating the media stream to the second endpoint. In more specific instances, the processing may include converting a speech in the media stream to text in a first language; converting the text in the first language to text in a second language; rendering the text in the second language; and adding the rendered text in the media stream.

18 Claims, 5 Drawing Sheets

SYSTEM AND METHOD FOR INSERTION AND REMOVAL OF VIDEO OBJECTS

TECHNICAL FIELD

This disclosure relates in general to the field of electronic communications and, more particularly, to a system and a method for insertion and removal of video objects.

BACKGROUND

Consumer and business Internet traffic is increasingly using rich-media applications, such as gaming, video collaboration, Internet Protocol (IP) TV, and music streaming. Some estimates dictate that video data will account for approximately 90% of consumer Internet traffic by the year 2012. Networked video devices (e.g., video surveillance) are being increasingly used in communications networks. Businesses can use video platforms to create competitive advantages, lower costs, and reduce environmental effects. For example, some businesses use web conferencing to host meetings. It can be challenging to accommodate video application demands, while reducing complexity, accounting for capacity, and offering an enjoyable user experience.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method is provided and may include receiving a media stream from a first endpoint, where the media stream is intended for a second endpoint (e.g., address to the second point, intended to be received by the second point, etc.). The method may further include processing the media stream according to at least one processing option (which can include any number of possibilities, as detailed below). The method may further include compressing the media stream, and communicating (e.g., sending, forwarding, transmitting, etc.) the media stream to the second endpoint (e.g., communicating the media stream toward a next hop in the network, to a network element that would subsequently relay the media stream to the second point, etc.). In more specific instances, the processing may include converting a speech in the media stream to text in a first language; converting the text in the first language to text in a second language; rendering the text in the second language; and adding (e.g., overlaying) the rendered text in the media stream.

In yet other examples, the processing of the media stream may include extracting a network time protocol (NTP) timestamp from the media stream; decoding the NTP timestamp to a local time; and adding the local time as text in the media stream. Separately, the processing of the media stream may include inserting or removing an advertisement in the media stream. The advertisement may include text associated with a multipoint video conference.

In addition, the processing option can include any number of possibilities, including (but not limited to) an input format associated with the media stream; an output format associated with the media stream; a device profile associated with at least one of the endpoints; a geographical location associated with at least one of the endpoints; a language preference associated with at least one of the endpoints; and content associated with the media stream.

Example Embodiments

Figure 1:
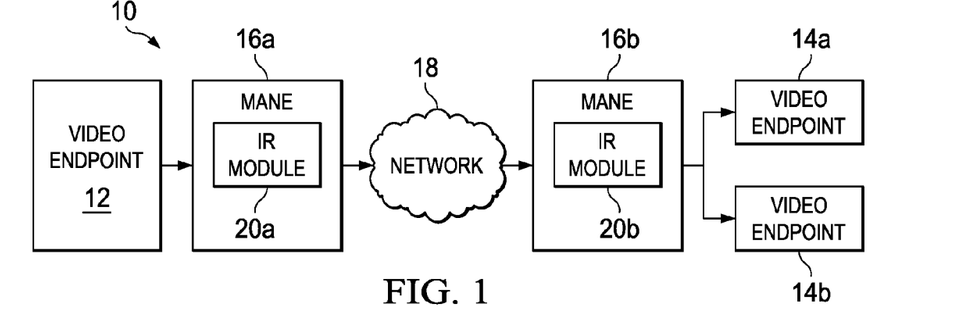
FIG. 1 is a simplified diagram illustrating one embodiment of a communication system in accordance with the present disclosure.

Turning to FIG. 1, FIG. 1 is a simplified block diagram of an example communication system 10 for network-based dynamic insertion and removal of video objects in accordance with one embodiment of the present disclosure. As used herein, the terminology "video object" includes any type of video data, image data, graphics, watermarking, text, audio, etc. The example architecture of FIG. 1 may include one or more senders (e.g., a video endpoint 12) configured to send a media stream to one or more receivers (e.g., a set of video endpoints 14a and 14b) over a network 18. One or more network elements, such as a set of Media Aware Network Elements (MANEs) 16a and 16b may be inserted between the senders and the receivers to process the media stream. In certain instances, MANEs 16a and 16b may be inserted at an edge of a network that includes the respective video endpoints (e.g., video endpoint 12, and video endpoints 14a-b). For example, MANE 16b may be located at an edge of an organization's Local Area Network (LAN), which includes video endpoints 14a and 14b. MANE 16a may process video signals from the one or more senders (e.g., video endpoint 12), and MANE 16b may further process the media stream before forwarding it to the receivers (e.g., video endpoints 14a and 14b).

MANE 16a and 16b may be equipped with a respective Insertion/Removal Module (IR module) 20a and 20b. IR modules 20a and 20b may be configured to dynamically insert and/or remove one or more video objects in the media stream within the network. In an example embodiment, the dynamic insertion/removal activities may leverage central knowledge of the network. In an example scenario involving a video conference, the media streams that are participating in the conference may be dynamically composed, where graphics may be added (e.g., overlaid) on top of the composed media stream. In an example implementation, the overlaid graphics may be text corresponding to the speakers' names, along with graphics representing a watermark or any other relevant items (e.g., a clock). In this example, an endpoint that lacks graphics processing or media processing capability can benefit from the processing capability of the network by leveraging IR modules 20a or 20b. The processing may be also distributed across many network elements (e.g., MANEs 16a and 16b) instead of being concentrated at a single endpoint, such as an endpoint that has media processing capability. Endpoints may be able to view the media stream in a uniform format, irrespective of individual media processing capabilities.

Video timing mechanisms (e.g., clocks) may also be inserted into the media stream to represent the actual time associated with the endpoints (e.g., endpoints 12, 14a, and 14b). This information may be determined in the network and added as a graphics overlay by one or more IR modules 20a or 20b. Video objects may also include translations of text added on top of the media stream. For example, text overlaid by IR module 20a may be translated by IR module 20b into a language that is suitable for endpoints 14a and 14b. A network element (e.g., IR module 20a or 20b) may determine the language that corresponds to the geographic location of the destination endpoint (e.g., video endpoints 14a and 14b), for example, by using the destination Internet Protocol (IP) address and a look-up table.

In another example scenario, video objects (e.g., transient objects) in the media stream may be removed by IR module 20a or 20b. For example, an image or video of a moving object or person in a media stream may be removed from the stream by using image segmentation techniques in conjunction with motion estimation. In an example video conference scenario, specific participants, or objects may be removed from a composed or stitched scene based on endpoint preferences or capabilities. In yet another example scenario, a network node that maintains the state of a collaborative multi-party video session (e.g., a multipoint control unit (MCU)), may augment egress media streams with targeted information for a sub-set of the participants. The sub-set of the participants may have common traits (or affinities), and the targeted information may be pertinent to those traits (or affinities). For example, targeted banner or text advertisements may be sent to some participants, but not sent to other participants. Such insertion/removal operations may be performed in the network rather than at individual endpoints. A network element (e.g., MANE 16a or 16b) may have access to the media streams traversing the network and, further, may have processing capabilities, which do not exist at the endpoints (e.g., video endpoint 12, 14a, or 14b).

Note that current networking technology is forcing many IP network architectures to become medianets. A medianet is typically configured for enabling the optimization of rich-media (e.g., including video applications). For example, the medianet may include network elements that can identify media and, subsequently, process the media if appropriate. A medianet may also enable interoperability between previously incompatible video endpoints, while ensuring a consistent and an optimal quality of experience. For example, a medianet can format video to match the characteristics of an endpoint. Furthermore, the medianet can detect traffic conditions and provide for proper transmission of media streams, as it recognizes the types of media propagating in the network. For instance, sending a high-definition (HD) video stream from a surveillance camera to a mobile device can require adapting: (i) the media type to suit the mobile device (e.g., in resolution and format); and (ii) the speed of the wireless connection (e.g., Wi-Fi, third-generation (3G), Global System for Mobile Communications (GSM), and edge connections).

The medianet may include services (e.g., media processing services) that are added to routers, switches, and endpoints. Some services are added to endpoints, and others may be configured on intermediate routers, switches, and MANEs. A medianet service can apply media transformations (e.g., transcoding), and change media and signal encoding to adapt to changing network conditions. For example, medianet services may be configured to understand a source and destination of media streams and, further, adapt the media stream transmission rate considering changing capacity characteristics of the network connections. Medianet services may enhance and augment media automatically. Enhancements can include color correction, speech-to-text-tag clouds, metadata capture, and application of graphic overlays and watermarks. However, such services do not typically use network information or location information.

Typically, enhancements (e.g., object insertion/removal) that use location information are done at the endpoints in a medianet. However, it is often not feasible to perform object insertion/removal at the endpoint for various reasons. For example, an endpoint may not have hardware or software capabilities (e.g., graphics processing or media processing capability) to insert/remove the objects. Further, an endpoint that participates in a multi-party video conference may not have access to other videos (that are to be composed together) to perform the necessary object insertion and removal. In scenarios where it is desirable to add destination-based content into the media streams, an endpoint may not have access to information that is germane to the destination to effectively insert/remove the correct objects. Processing of information according to local criteria (such as language translations, participant traits, community affinities, etc.) may be difficult to accomplish at endpoints because of significant processing and communication overhead.

Communication system 10 is configured to address these issues (and others) in offering a system for network-based dynamic insertion and removal of video objects. In certain implementations, a network node (e.g., MCU) that maintains a state of a collaborative multi-party video session may have access to the individual media streams that are participating in the session. This information can be accessed and used by MANEs (e.g., MANE 16a or MANE 16b) to perform certain kinds of processing such as augmenting the egress media streams with information pertinent to traits of a sub-set of endpoints (e.g., video endpoints 14a and 14b). As another example, consider the case where a video is to be multicast to several destinations and the video is to have text overlaid on the media stream. In this scenario, the text should be in the language that corresponds to the destination. For such a case, MANE 16a or MANE 16b may dynamically determine the geographic location of the endpoint through IP addresses (and/or a look-up table) to determine the correct language of text for insertion. IR modules (e.g., IR module 20a and 20b) may use this information to translate the overlaid text.

In example embodiments, MANEs may be located at the sender's network exclusively, or at the receivers' network exclusively, or at both sender's and receivers' networks. Video endpoint 12 is configured to send media streams to more than one network, and appropriate MANEs configured with IR modules may be located at one or more of such networks. Each MANE may be connected to one or more video endpoints having different display and processing capabilities. One or more senders may send media streams to a MANE. A MANE may forward compressed, processed media streams to one or more receivers. One or more MANEs may be provisioned in any appropriate location of the network, or provisioned at a specific location, which may be private. It should be noted that the network configurations and interconnections for the MANEs shown and described herein are for illustrative purposes only. FIG. 1 is intended as an example and, accordingly, should not be construed to imply architectural limitations of the present disclosure.

Note that by inserting one or more MANEs between at least one sender and at least one receiver in a network, media processing capabilities of a medianet may be enhanced. There may be certain benefits to performing object modification (e.g., insertions and removals) within the network, as opposed to performing the object modification at the endpoints. By performing media processing in MANEs 16a, 16b, endpoints that consume media may not use high performance processing capabilities. In example embodiments, such as multiparty video conferences, the network may have access to state information that the endpoint does not have: enabling certain kinds of processing that would not be architecturally possible at an endpoint. In another example embodiment in which identical processing is performed for media that is to be consumed by a plurality of endpoints, the processing could be performed once in the network and yet effectively consumed multiple times separately at each endpoint.

Before detailing additional operations associated with the present disclosure, the infrastructure of FIG. 1 is described. As used herein, the term "endpoint" encompasses nodes that originate data packets in a network flow, and nodes that can be a final destination of the data packets in the network flow. Furthermore, the endpoints can include any video component, video camera, electronic device, node, client, server, terminal, peer, service, application, endpoint, switch, console, proprietary component, telephone, bridge, computer, personal digital assistant (PDA), laptop or electronic notebook, i-Phone, iPad, Google Droid (or any other type of smartphone), a Telepresence system, an access point, or any other device, component, element, or object capable of facilitating packet communications.

Additionally, endpoints may include any kind of device or software (e.g., Cisco® Flip™ cameras, Cisco® TelePresence® Content Server, encoders, multimedia encoders, recorders, multimedia authoring software, etc.) capable of receiving and/or sending media streams. Endpoints also encompass devices typically configured to uncompress compressed media streams and display the video on a visual display, such as a computer screen, a monitor, etc. Furthermore, an endpoint may be any electronic device (e.g., machine device or a mobile device), client, server, peer, service, application, or other object capable of sending, receiving, or forwarding information over communications channels in a network. Additionally, the terms "sender" and "receiver" are simply referencing endpoints that are configured for sending and receiving data packets in a particular scenario. A sender and a receiver may share certain transmission responsibilities and/or reciprocally conduct communications with each other (e.g., in a network environment).

Each of MANEs 16a-16b are network elements, where the term "network element" is meant to encompass computers, network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. Data, as used herein, refers to any type of numeric, voice, video, or script data, or any type of source or object code, or any other suitable information in any appropriate format that may be communicated from one point to another in electronic devices and/or networks.

In more specific instances, each MANE 16a-16b can operate as a middlebox or application layer gateway that is configured for: (i) parsing certain aspects of real-time transport protocol (RTP) payload headers or the RTP payload; and (ii) reacting to the contents. MANEs 16a-16b can allow packets to be dropped according to media coding needs. For example, if a MANE has to drop packets due to congestion on a certain link, it can identify packets that may be of a least significance for quality of service (QoS), and drop such packets preferentially over other packets.

The example architecture of FIG. 1 may be configured as one or more networks and, further, provisioned in any form including, but not limited to, local area networks (LANs), wireless local area networks (WLANs), virtual local area networks (VLANs), metropolitan area networks (MANs), wide area networks (WANs), virtual private networks (VPNs), Intranets, Extranets, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area network (e.g., the Internet).

In addition, gateways, routers, switches, and any other suitable network elements may be used to facilitate electronic communication between various nodes, for example, between video endpoint 12 and video endpoints 14a and 14b. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. The network illustrated in FIG. 1 may include a configuration capable of transmission control protocol/Internet protocol (TCP/IP) communications for the electronic transmission or reception of packets in a network. The network could also operate in conjunction with a user datagram protocol/IP (UDP/IP) or any other suitable protocol, where appropriate and based on particular needs.

Figure 2:
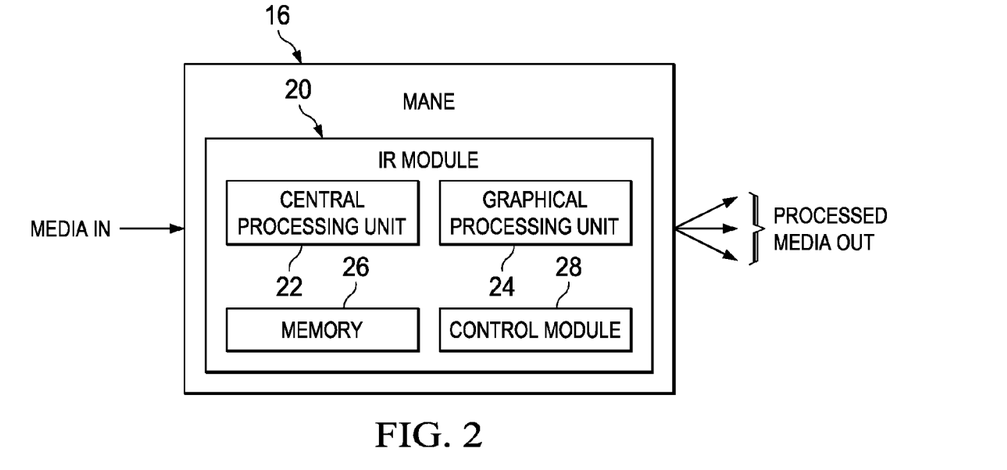
FIG. 2 is a simplified block diagram illustrating additional details of the communication system in accordance with the present disclosure.

Turning to FIG. 2, FIG. 2 is a simplified block diagram illustrating additional details of example embodiments according to the present disclosure. MANEs 16a-16b may be configured with IR module 20, which can include (or be coupled to) a central processing unit (CPU) 22, a graphical processing unit (GPU) 24, a memory 26, and a control module 28. GPU 24 may be configured to perform myriad media processing functions, for example, text overlay, text rendering, video processing, image processing, etc. GPU 24 may include a specialized circuit designed to manipulate images and also the provisioned with a highly parallel computing structure, which can make it more effective than general-purpose CPUs (e.g., for algorithms where processing of large blocks of data is done in parallel). The components shown in FIG. 2 may be located physically on a single device (e.g., a microprocessor), or on multiple devices and, further, may be interconnected by appropriate electrical/communication pathways (e.g., on a video card or motherboard). Each component may be provisioned with appropriate network interfaces and communication links for sending, receiving, and/or processing data.

Video endpoints that are sending and receiving media streams may negotiate control information for the media streams. In addition, users at receivers and/or senders on appropriate networks may choose insertion/removal options for their respective media streams. For example, a network administrator may set certain processing options for MANEs 16a-16b. The processing options may include input format, output format, device profiles, geographical locations of the senders and the receivers, language preferences, community affinities, and a subject matter of the media stream, etc. The processing options may be stored on MANEs 16a-16b (or elsewhere in the network) and used by control module 28 to process incoming media streams.

Encoded media (e.g., encoded and compressed video streams) may be received from one or more senders by MANEs 16a-16b via appropriate network ports. Incoming media streams may be encapsulated in various layers. For example, the media stream may be encapsulated in a transport layer comprising RTP or an MPEG container. MANEs 16a-16b may strip the transport layer to extract compressed elementary data, for example, in a H.264 string, and uncompress the string. GPU 24 may process the uncompressed string. MANEs 16a-16b may compress the processed media stream, and forward the compressed, processed media over one or more communication links to one or more receivers.

MANEs 16a-16b may be provisioned in network 18 as a stand-alone network appliance box, or they may be integrated with other device, such as routers, switches and other media processing devices. MANEs 16a-16b may be capable of integrating video into meetings, events, training and education, organizational communications, and advertising to enable faster business decision making, global collaboration, and scaling of expertise. The capabilities may include transcoding (e.g., change format), up and down resolution, speed transrating (e.g., change speed), cropping, scaling, color enhancements, graphic overlays, speech-to-text, video key word search, speaker search and other analytics features.

According to example embodiments, MANEs 16a-16b may be conjured to insert an introductory video (bumper) before a source media stream with fades for transitioning (in and out). Any graphic file with a transparent alpha channel can be used as a watermark and applied anywhere in the media stream (with fully customizable transparency and duration). Support for graphic overlay options in MANEs 16a-16b may allow layering of a fully animated graphic on top of a source video. MANEs 16a-16b may also support sophisticated multimedia effects such as timeline-based fades, smooth animation, etc. Graphic overlays can be used to add dynamic multilayered titles, branded graphics, subtitles, captions, and animations on top of the video.

According to example embodiments, MANEs 16a-16b may be configured to support common source file formats. Additionally, MANEs 16a-16b may support any file-to-file transcoding workflow and operate to produce one or many outputs. Inputs and outputs to MANEs 16a-16b can include audio, standard definition (SD) video, and full high-definition (HD) resolutions and bit rates. For example, input formats of media streams may include: MPEG SS (System Stream) (e.g., MPEG-1 for video and MPEG-1 Layer 2 for audio), MPEG-2 PS (Program Streams) (e.g., MPEG-2 for video and MPE-1/2 Layer 2 for audio), MPEG-2 TS (Transport Stream) (e.g., MPEG-2 for video and AAC, MPEG-1/2 Layer 2 for audio), MPEG-ES (Elementary Streams) (e.g., MPEG-1, MPEG-2 for video), Windows Media (e.g., Windows Media V9 for video and Windows Media Audio for audio), etc. Media streams that are output from MANEs 16a-16b may be in compressed formats. For example, output formats from MANEs 16a-16b may include live output (e.g., Windows® Media Video (WMV) and H.264 Flash), MPEG-2 TS (Transport Stream) (e.g., MPEG-2 and H264/AVC (Baseline, Main and High Profiles, 4:2:0 8-bit) for video and AAC, MPEG-1/2 Layer 2 for audio).

Source multimedia streams can be transcoded and transrated for playback on a wide variety of networks and devices. For example, MANEs 16a-16b may be preconfigured for web and mobile output devices and formats, including WMV, Flash, Real, QuickTime, and H.264. MANEs 16a-16b may support MPEG-2 TS and Windows Media (unicast and multicast), and ingest media streams from devices such as the Cisco® TelePresence Content Server, Cisco® Digital Media Encoders, Cisco® Scientific Atlanta encoders, and other encoders and enterprise IPTV broadcasts.

In example embodiments, MANEs 16a-16b may include a library of default device profiles, for example, device profiles that represent common network and playback devices. As used herein, a "device profile" encompasses a set of attributes (services and/or features) that are associated with a particular device, including name, description, add-on modules, softkey templates, multilevel precedence and preemption (MLPP) information, directory numbers, subscribed services, specifications for application specific programming for mobile devices, implementation constraints to enable secure web service messaging on resource-constrained devices, device capabilities, etc. Administrators can freely modify these profiles, or create new profiles, to meet virtually any application requirements for formats, resolutions, and speeds. In an example embodiment, MANEs 16a-16b may be provisioned with a software-based CPU driven transcoding system in IR module 20 that can be upgraded to support future devices and formats. MANEs 16a-16b may also be optionally provisioned with software and user interfaces or consoles that provide users (e.g., network administrators) insight into status of new jobs, configuration settings, etc.

Media streams (e.g., source videos) can be automatically enhanced, including the application of color corrections, cropping, scaling, etc. Watermarks can be placed anywhere within the video, for example, to mark content confidential or provide copyright notices or other messaging. User-customizable graphic overlays, for example, in SWF format, can be superimposed onto video files. Graphic effects may be 'burned-into' the videos in real time to play back fully synchronized on any device compatible with output formats supported by MANE 16. In an example embodiment, the same input source can have different graphics applied and the outputs can be directed to different destinations, making it easy to repurpose the same source for multiple audiences. For example, one or more MANEs located at edges of multiple networks may process the same media stream differently according to the teachings of the present disclosure. Additionally, it should be noted that the term "media stream" (as used herein to describe the activities of communication system 10) includes any type of data (e.g., video, audio and any other media content) sent (sometimes in an encoded/compressed form) over a network (and, in certain instances, displayed by the video endpoint in real time). In the case of streaming video, the media is sent in a continuous stream of data and is played as it arrives.

Video processing may also include color space conversion; contrast enhancement; cropping; de-interlacing and interlacing; fade-in and fade-out; in/out trimming; field frame control; gamma correction; hue rotation; inverse telecine; noise reduction; saturation; support for 16:9 and other ratios; insert/remove letter boxing and curtaining; temporal smoothing; video frame rate conversion and resizing with anti-alias filtering; automated thumbnail extraction, etc. In an example embodiment, MANEs 16a-16b may be configured with a speech-to-text option, allowing it to extract audio from a file and produce a time-stamped transcript, which can be turned into open captioning and delivered as an Extensible Markup Language (XML) file and/or transcript for use in other applications.

According to example embodiments described herein, MANEs 16a-16b may encompass capabilities of transcoders, media gateways, and MCUs. As a transcoder, MANEs 16a-16b may convert media (e.g., video and audio) from one format to another. Codec, resolution, frame rate, bit rate, and encapsulation format may be changed from one standard to another so that a display device (such as a PC, a video conferencing endpoint, or a mobile device) can be used to receive media that otherwise would have been incompatible. As a gateway, MANEs 16a-16b may reside between two networks, and allow traffic to pass between those networks. MANEs 16a-16b can provide conversion between the signaling and media formats of the two networks. MANEs 16a-16b may also allow multiple video conferencing endpoints to participate in two-party calls and multi-party conferences, providing signaling and call-control functions; video transcoding (for incompatible devices); video mixing (to show multiple participants in a single screen); and a range of scheduling, management, and security features.

Figure 3:
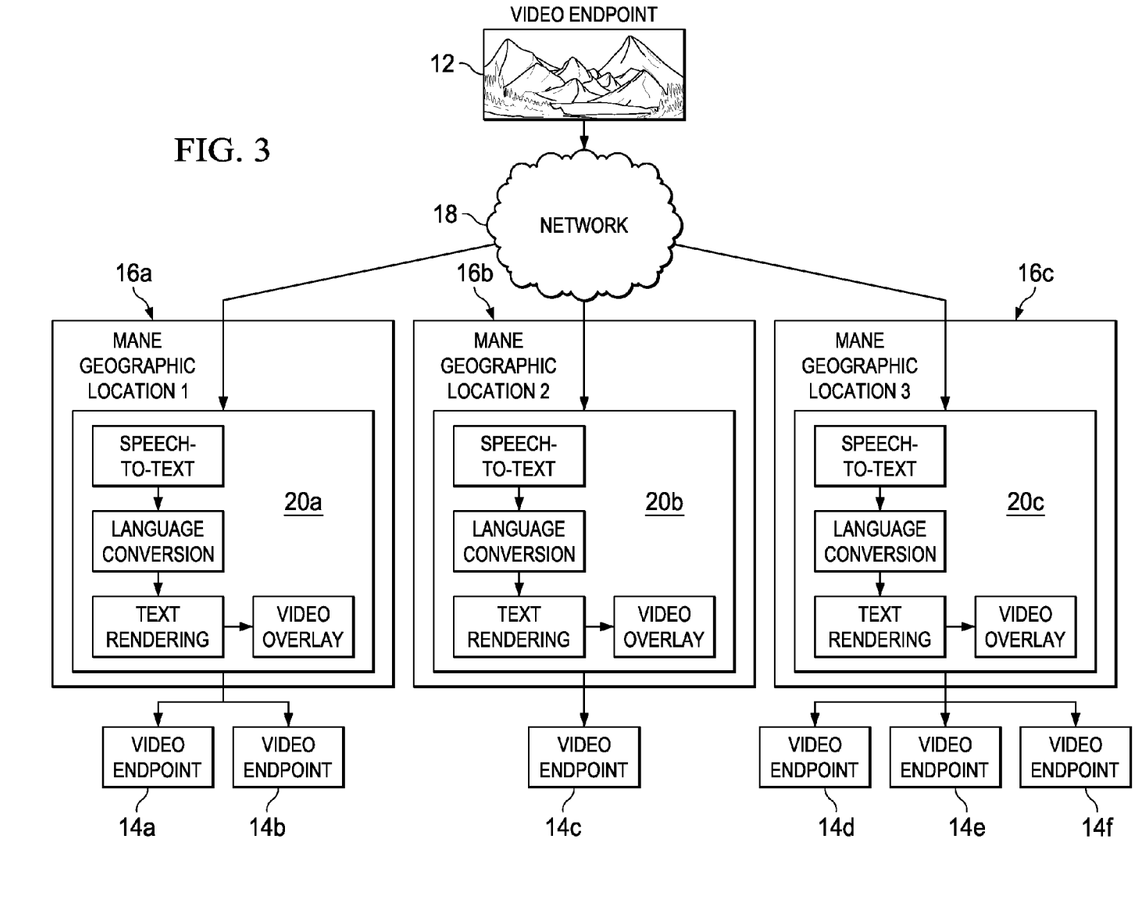
FIG. 3 is a simplified block diagram illustrating an example embodiment according to the present disclosure.

Turning to FIG. 3, FIG. 3 illustrates a simplified block diagram illustrating an example embodiment of the present disclosure. Video endpoint 12 may send media streams over network 18 to video endpoints 14a-f. Video endpoints 14a and 14b may be located on a network serviced by MANE 16a. Video endpoint 14c may be located on another network serviced by MANE 16b. Video endpoints 14d-f may be located on yet another network serviced by MANE 16c. Each network may be located at different geographic locations 1, 2, and 3, for example, Russia, United States, and China. MANEs 16a, 16b, and 16c may be configured with IR modules 20a, 20b, and 20c respectively, which are configured to process the media streams, as outlined herein.

In the example shown in FIG. 3, the media stream may be multicast/broadcast from video endpoint 12, or as a part of a multipoint video conference (e.g., where video endpoints 12 may send video data during the conference). MANEs 16a-c may have knowledge of the various geographical locations of the respective endpoints. For example, respective network administrators may configure MANEs 16a, 16b, and 16c with information about geographical locations and language preferences, among others. IR modules 20a, 20b, and 20c may include modules for speech-to-text conversion, language conversion (e.g., to the preferred language), text rendering and video overlay. The modules for speech-to-text conversion, language conversion, text rendering, and video overlay may be facilitated by appropriate GPUs, CPUs, memory, and control modules in IR modules 20a-c.

Each MANE (e.g., MANE 16a, 16b, and 16c) may receive a media stream from video endpoint 12. The media stream may comprise video and audio (e.g., speech). Appropriate components in IR modules 20a-c may covert the speech to text in a first language (e.g., English). Each MANE 16a-c may access processing options (e.g., language preferences, geographical locations, etc.) to covert the text in the first language to a second language. For example, MANE 16a may convert the text in the first language to Russian. MANE 16b may not convert the text if the first language is English. MANE 16c may convert the text in the first language to Chinese. Each MANE 16a-c may render the text in the respective languages. This rendering can include setting the text according to particular font formats (e.g., TrueType font, OpenType font, etc.), character sets (e.g., Cyrillic, Devanagiri, etc.), and text style and effects (e.g., underline, bold, etc.). In other instances, the rendering can more generally include any type of processing associated with the particular media stream. Each MANE 16a-c may then overlay the rendered text (e.g., as close captioned text) in the media stream. The processed media stream may be compressed before being forwarded to the respective receivers. Thus, users viewing the video conference at video endpoints 14a and 14b will see Russian language translation of the speaker's audio on their displays. In contrast, users viewing the video conference at video endpoints 14d-f will see Chinese language translation of the speaker's audio on their displays.

In an example embodiment, the closed caption text may be overlaid at the sender (e.g., video endpoint 12). Multiple sessions may be established for each receiving network. Each session may have a different closed caption text overlay depending on the language used by the receiver(s) (e.g., video endpoints 14a-f). In an alternate embodiment, the closed caption text may be overlaid at each of the receivers (e.g., video endpoints 14a-f). Each receiver (e.g., video endpoints 14a-f) may be configured with a capability to perform speech-to-speech conversion in addition to graphical capabilities for doing the overlay. However, a receiver (or sender) may not be equipped with such media processing capabilities in which case receiver(s) (or senders) that do not have appropriate hardware can directly benefit from processing done within the network by MANEs 16a-c.

Figure 4:
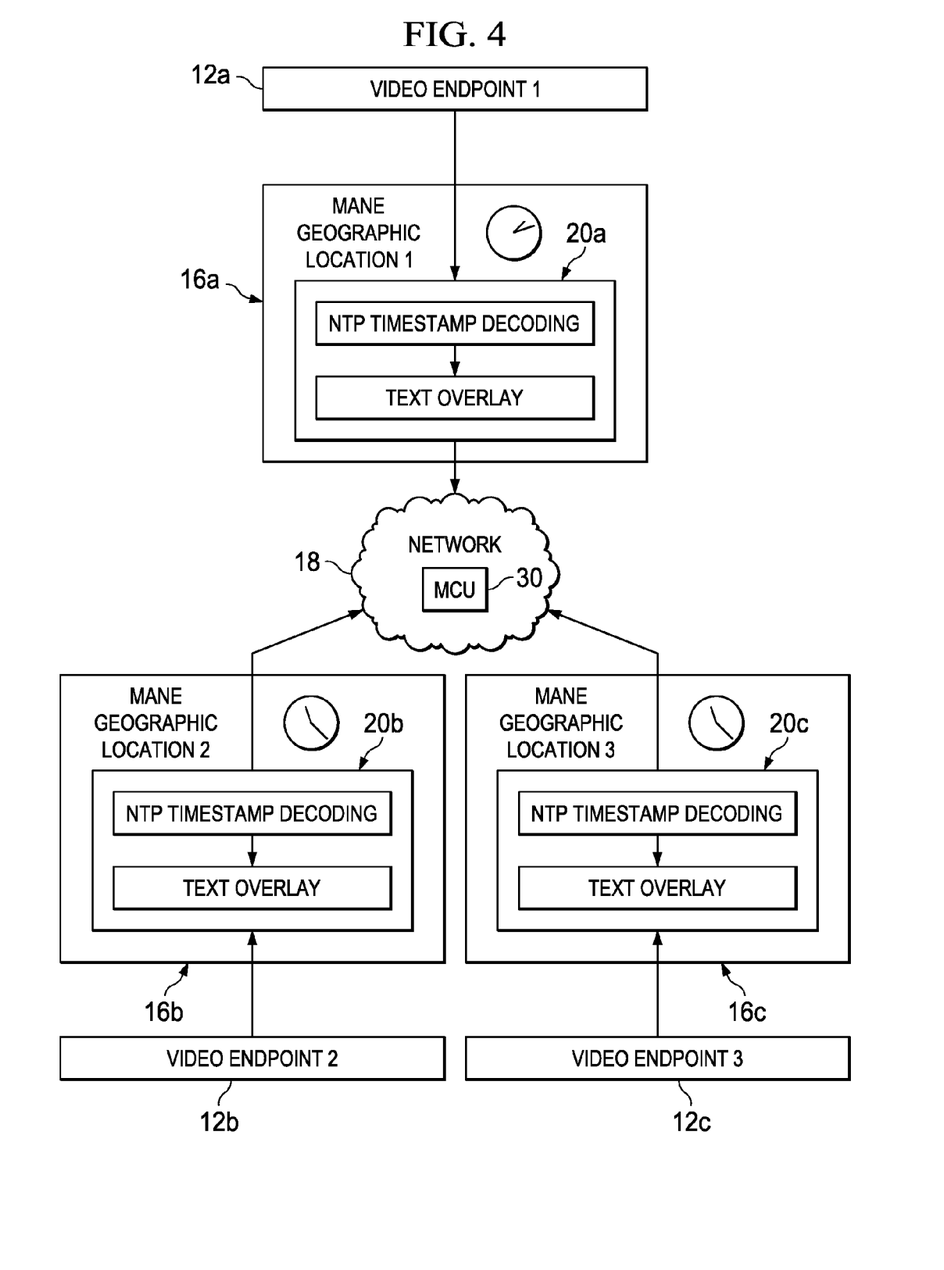
FIG. 4 is a simplified block diagram illustrating another example embodiment according to the present disclosure.

Turning to FIG. 4, FIG. 4 illustrates a simplified block diagram illustrating another embodiment of the present disclosure, where local time of different video endpoints may be overlaid on video in a multipoint conference scenario. According to the embodiment shown in FIG. 4, MANEs 16a, 16b, and 16c may be coupled to video endpoints 12a, 12b, and 12c, respectively. FIG. 4 shows a single video endpoint connected to each MANE. In example embodiments, more than one video endpoint may be connected to each MANE. For example, a MANE may be located on an edge of a LAN and connected to multiple video endpoints within the LAN. Each MANE 16a-c may be located in separate geographic locations 1, 2, and 3 subject to different time zones, for example, United States Central Time Zone, Russia, and Japan, respectively. An MCU 30 may aggregate and coordinate network traffic from video endpoints 12a-c over network 18.

Many networks, such as network 18, may use network time protocol (NTP) to coordinate network traffic. NTP provides a coordinated universal time (UTC), which does not provide any information about local time, time zones, or daylight savings time. Each MANE 16a-c may extract NTP timestamps from the media stream traversing the network between video endpoints 12a-c, decode them to respective local times of the senders and receivers, render the timestamps as text (e.g., text of local time), and overlay the different local times as text on the media stream. The decoding to respective local times may be performed at the respective MANEs within the network rather than at endpoints for various reasons. For example, endpoints may lack information about geographical locations of the other endpoints; endpoints may not be equipped with the capability to convert NTP timestamp to local time; and multiple media streams from various endpoints may have to be stitched together, possibly by MCU 30, to permit display of the respective local times.

In an example embodiment, MANE 16a (located in the United States) may extract an NTP timestamp from the media stream traversing the network. MANE 16a may use information about the network to determine geographical location of MANEs 16a-c (e.g., MANE 16a may be located in US Central time zone, MANE 16b may be located in the Russia time zone and MANE 16c may be located in the Japan time zone). An NTP timestamp decoding module in IR module 20a in MANE 16a may decode the NTP timestamp to respective local times (e.g., decode NTP timestamp to Russian local time for video endpoint 12b and Japanese local time for video endpoint 12c). A text overlay module in IR module 20a may convert the respective times to a text/graphics overlay on the outgoing media stream to video endpoint 12a. Users viewing the video at video endpoint 12a at 8:00 AM United States Central Time can then visually see that participating video endpoint 12b in Russia is at 5:00 PM local time and participating video endpoint 12c in Japan is at 10:00 PM local time. Alternately, each MANE 16a-c may decode the NTP timestamp to its respective local time and provide the local time to MCU 30, which can add (e.g., overlay) the respective local times on the media stream.

In another example embodiment, each MANE may add graphics or text to represent network statistics to end users at respective video endpoints. As a multimedia stream flows downstream through a network, successive MANEs can append network statistics observed by them at their respective locations. In this manner, end users may be able to determine a media quality bottleneck that occurs within the network.

Figure 5:
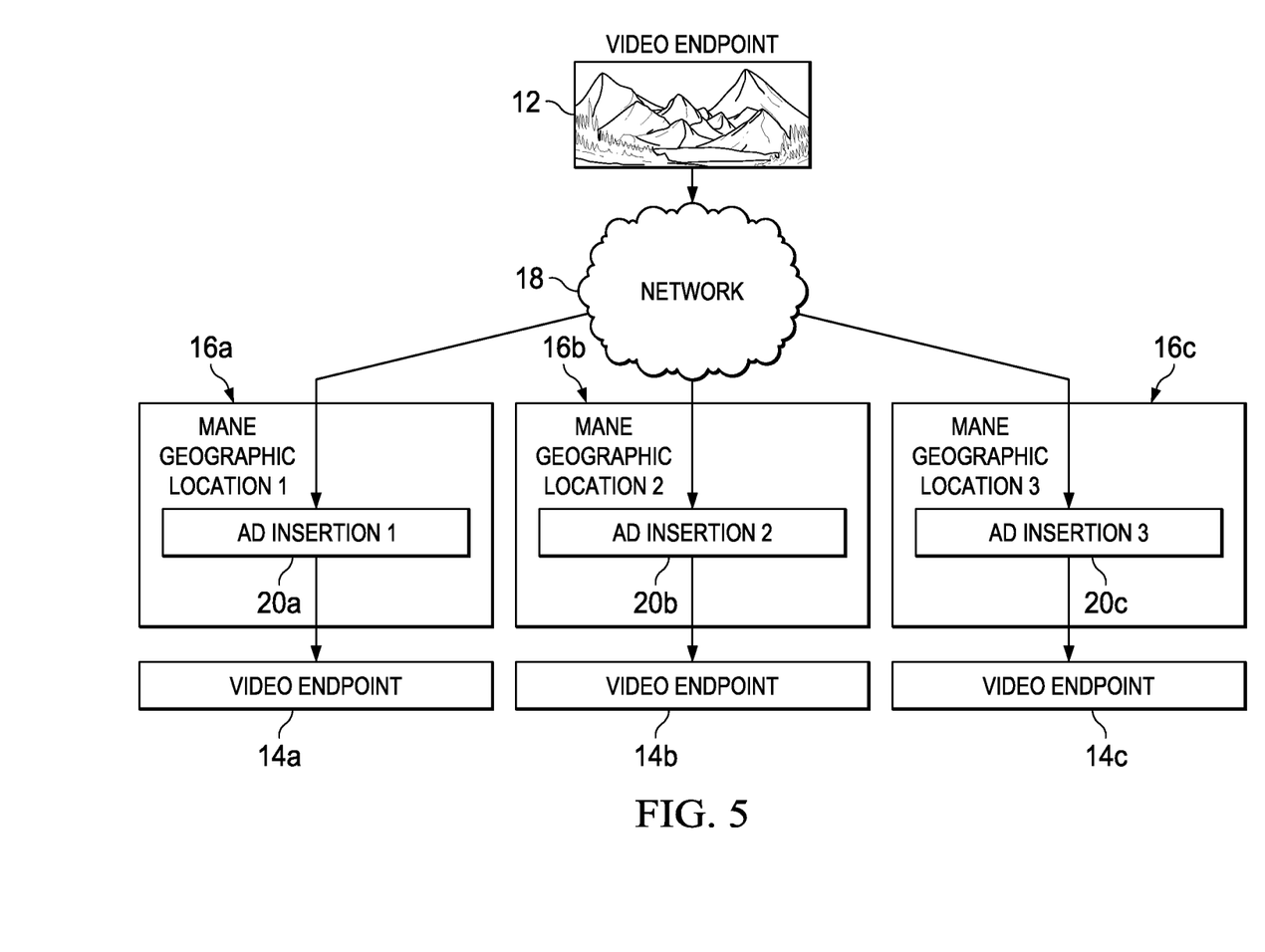
FIG. 5 is a simplified block diagram illustrating yet another example embodiment according to the present disclosure.

Turning to FIG. 5, FIG. 5 illustrates a simplified block diagram illustrating yet another embodiment of the present disclosure. Advertisements may be inserted into a media stream sent from video endpoint 12 over network 18. The media streams may be designated for multiple geographical locations (e.g., locations 1, 2, and 3). In an example embodiment, a MANE (e.g., MANE 16a, 16b, or 16c) may reside in a local branch office that is near the receiver video endpoint(s) (e.g., video endpoints 14a, 14b, or 14c respectively). The sender (e.g., video endpoint 12) can be agnostic to the receivers (e.g., video endpoints 14a-c) and can multicast or broadcast its content, as opposed to sending multiple targeted streams separately (for example, to each video endpoint 14a, 14b, and 14c).

If the sender (e.g., video endpoint 12) sends a media stream with multiple advertisement links targeted at multiple geographic locations, each receiver (e.g., video endpoints 14a-c) may not incur a cost of opening a network connection to obtain the advertisement, and to insert the advertisement into the media. In particular, it may be possible that only some of the advertisements in the media stream will be relevant to each location. Thus, IR modules 20a-c may be configured with appropriate ad insertion modules 1, 2, and 3, respectively, that may choose the advertisements to insert, remove the others, and perform alternate/additional processing before forwarding the media stream to respective endpoints through MANEs 16a-c. Additionally, IR modules 20a-c in MANEs 16a-c can insert advertisements that may be relevant to specific geographic locations and/or communities (e.g., advertisements that cater to local demographics and time-of-day at the geographic location).

As used herein, the term "advertisement" encompasses any type of data representation including location aware captioning, dynamic product placement, graphical images, video, audio and/or text (e.g., sidebar conversations), or any other content that may be relevant to a locality (e.g., a geographic location such as location 1, 2 and 3), and/or a community of participants (e.g., audience viewing the media content). MANES 16a-c may be configured to enable insertion/removal of content based on geographical location, and affinities (e.g., interests) of the community of participants. In another example embodiment, the advertisements may be aligned to the content (i.e., the subject matter) being transmitted, for example, in a multi-party conversation. In embodiments, the affinities of the community of participants may be inferred by respective MANEs (e.g., MANE 16a-c) using various means, for example, analyzing content of the media communication. They could also be known apriori based on knowledge accumulated at the MANE about the community of participants from previous communications, or through predetermined (or preconfigured) policies.

For example, MANE 16a may be located in a branch office of a communications company in San Jose, Calif. Typical users accessing content on the network (which may include MANE 16a) may be interested in global technology news during weekdays, content related to restaurants in San Jose during weeknights, and content related to entertainment locations in California during weekends. MANE 16a may therefore be configured with appropriate policies incorporating such preferences. Thus, dynamic product placements sent to users on the network (that includes MANE 16a) may be screened for relevance, where (in certain instances) only global technology news related dynamic product placements may be forwarded to users in the network on weekdays.

On the other hand, MANE 16b may be located in a branch office of the communications company in Beijing, China. Typical users accessing content on the network (which may include MANE 16b) may be interested in global technology news during weekdays, content related to restaurants in Beijing during weeknights, and content related to sports in China during weekends. MANE 16b may therefore be configured with appropriate policies incorporating such preferences. Thus, dynamic product placements sent to users on the network (which may include MANE 16b) may be screened for relevance, and only sports related dynamic product placements may be forwarded to users in the network on weekends. Thus, each MANE 16a, 16b, 16c may be configured with separate and different policies applicable to geographic locations and/or affinities of the community of participants.

In another example embodiment, insertion/removal may be of sidebar conversations in a multipoint video conference. A multi-party video conferencing session may be composed of sub-groups where a main dialogue between various parties occurs in a common language (e.g., English). Occasionally, different sub-groups (e.g., located in China and Japan) may choose to engage in "sidebar" conversations in their own respective language (e.g., Chinese and Japanese). For example, in FIG. 5, location 1 may be in United States, location 2 may be in China, and location 3 may be in Japan. MANE 16b, located in China, may strip out sidebar conversations from location 3 in Japan, and retain or add sidebar conversations from location 1 in United States and location 2 in China, based on community affinities (e.g., preferences of users at location 2). Such insertion and removal may be performed according to predetermined policies configured in MANE 16b. Each MANE 16a-c may have separate and disparate policies according to relevant community affinities (e.g., local user preferences).

Figure 6:
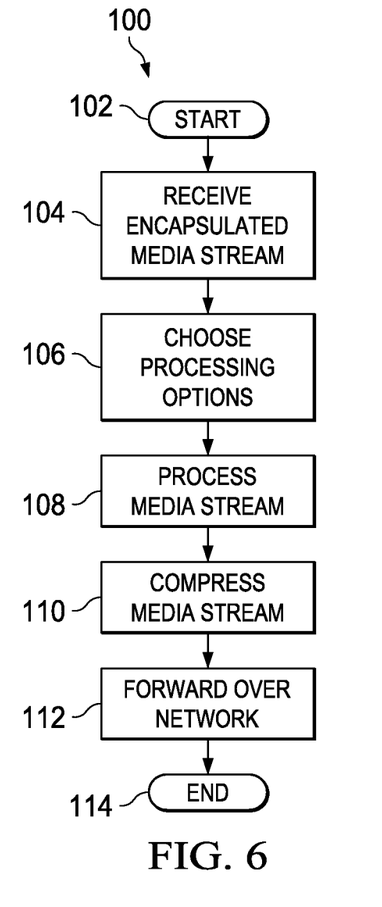
FIG. 6 is a simplified flowchart illustrating example operational activities that may be associated with embodiments of the present disclosure.

Turning to FIG. 6, FIG. 6 is a simplified flowchart showing example operational activities 100 associated with embodiments of the present disclosure. Embodiments of the present disclosure can dynamically insert or remove objects from media streams within the network. The particular flow of FIG. 6 may begin at 102, when one or more video endpoints send an encapsulated media stream into a network. MANEs 16a-16b may receive the encapsulated media stream in 104. In 106, IR module 20 may choose processing options according to predetermined policies, or configuration settings, or other control parameters. In an example embodiment, the processing options may include input format, output format, device profiles, geographical locations of the senders and receivers, community affinities, subject matter of the media stream and other preferences. Control module 28 in IR module 20 may send appropriate control signals based on the chosen processing options to GPU 24, CPU 22 and memory 26.

IR module 20 may process the media stream in 108. Processing may include converting a speech in the media stream to text in a first language, converting the text in the first language to text in a second language, rendering the text in the second language, and adding (e.g., overlaying) the rendered text in the media stream; extracting a NTP timestamp from the media stream, decoding the NTP timestamp to a local time at the sender, and adding (e.g., overlaying) the local time as text in the media stream; or inserting or removing an advertisement in the media stream, and other processing. In 110, the processed media stream may be compressed. The whole or part of the processing may be performed within MANE 16. The compressed, processed media stream may be then forwarded over the network in 112 to one or more receivers (e.g., video endpoints). The flow can end in 114, where similar operations can be repeated for subsequent flows.

In example implementations, at least some portions of the activities related to the network-based dynamic insertion and removal of video objects outlined herein may be implemented in software in, for example, IR module 20 and/or MANEs 16a, 16b. In some embodiments, one or more of these features may be implemented in hardware provided external to these elements, or consolidated in any appropriate manner to achieve the intended functionality. IR module 20 and/or MANEs 16a-16b may include software (or reciprocating software) that can coordinate in order to achieve the operations, as outlined herein. In still other embodiments, these elements may include any suitable algorithms, hardware, software, components, modules, interfaces, or objects that facilitate the operations thereof.

Furthermore, IR modules and MANE described and shown herein (and/or their associated structures) may also include suitable interfaces for receiving, forwarding, transmitting, and/or otherwise communicating data or information in a network environment. Additionally, some of the processors and memory elements associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (i.e., memory 26) can store data used for the operations described herein. This includes the memory element being able to store instructions (e.g., software, logic, code, etc.) that can be executed to carry out the activities described in this Specification. A processor can execute any type of instructions associated with the data to achieve the operations detailed herein in this Specification. In one example, processors (e.g., CPU 22 and GPU 24) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (i.e., memory 26) for storing information to be used in achieving operations associated with network-based dynamic insertion and removal of video objects as outlined herein. These devices may further keep information in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term "memory element." Similarly, any of the potential processing elements, modules, and machines described in this Specification should be construed as being encompassed within the broad term "processor."

Note that with the numerous examples provided herein, interaction may be described in terms of two, three, four, or more network elements, or MANEs. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that communication system 10 of the FIGURES and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols in which traffic management is being executed. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a video stream from a first endpoint;
   video processing the video stream according to an Internet Protocol (IP) address of a second endpoint, wherein the video processing the video stream comprises
   extracting a network time protocol (NTP) timestamp from the video stream,
   decoding the NTP timestamp to a local time, and
   adding the local time as text in the video stream; and
   communicating the video stream to the second endpoint.

2. The method of claim 1, further comprising:
   converting a speech in a media stream including the video stream to text in a first language;
   converting the text in the first language to text in a second language;
   rendering the text in the second language; and
   adding the rendered text in the media stream.

3. The method of claim 1, further comprising:
   compressing the video stream.

4. The method of claim 1, wherein the video processing the video stream comprises:
   inserting or removing an advertisement in the video stream.

5. The method of claim 4, wherein the advertisement comprises text associated with a multipoint video conference.

6. The method of claim 1, wherein the video stream is video processed according to a selected one of a group of processing options, the group consisting of:
   a device profile associated with at least one of the endpoints;
   a geographical location associated with at least one of the endpoints; and
   a language preference associated with at least one of the endpoints.

7. Logic encoded in non-transitory media that includes code for execution and, when executed by a processor, is operable to perform operations comprising:
   receiving a video stream from a first endpoint;
   video processing the video stream according to an Internet Protocol (IP) address of a second endpoint, wherein the video processing the video stream comprises
   extracting a network time protocol (NTP) timestamp from the video stream,
   decoding the NTP timestamp to a local time, and
   adding the local time as text in the video stream; and
   communicating the video stream to the second endpoint.

8. The logic of claim 7, wherein the operations further comprise:
   converting a speech in a media stream including the video stream to text in a first language;
   converting the text in the first language to text in a second language;
   rendering the text in the second language; and
   adding the rendered text in the media stream.

9. The logic of claim 7, wherein the video processing the video stream comprises:
   removing video objects by using an image segmentation protocol in conjunction with at least one motion estimation calculation.

10. The logic of claim 7, wherein the video processing the video stream comprises:
    inserting or removing an advertisement in the video stream.

11. The logic of claim 10, wherein the advertisement comprises text associated with a multipoint video conference.

12. The logic of claim 7, wherein the video stream is video processed according to a selected one of a group of processing options, the group consisting of:
    a device profile associated with at least one of the endpoints;
    a geographical location associated with at least one of the endpoints; and
    a language preference associated with at least one of the endpoints.

13. An apparatus, comprising:
    a processor operable to execute instructions;
    a memory; and
    a control module configured to interface with the processor such that
    the apparatus is configured to
      receive a video stream from a first endpoint;
      video process the video stream according to an Internet Protocol (IP) address of a second endpoint; and
      communicate the video stream to the second endpoint, and
    the processor is configured to
      extract a network time protocol (NTP) timestamp from the video stream;
      decode the NTP timestamp to a local time; and
      add the local time as text in the video stream.

14. The apparatus of claim 13, wherein the processor is configured to convert a speech in a media stream including the video stream to text in a first language;

convert the text in the first language to text in a second language;

render the text in the second language; and add the rendered text in the media stream.

15. The apparatus of claim 13, wherein the processor is configured to insert or remove an advertisement in the video stream.

16. The apparatus of claim 15, wherein the advertisement comprises text associated with a multipoint video conference.

17. The apparatus of claim 13, wherein the video stream is video processed according to a selected one of a group of processing options, the group consisting of:

a device profile associated with at least one of the endpoints;

a geographical location associated with at least one of the endpoints; and a language preference associated with at least one of the endpoints.

18. The apparatus of claim 13, wherein the apparatus is located at an edge of the network, which includes at least one video endpoint.

* * * * *